(12) United States Patent
Fujii

(10) Patent No.: US 10,375,295 B2
(45) Date of Patent: *Aug. 6, 2019

(54) IMAGING DEVICE HAVING AUTOFOCUS CAPABILITY

(71) Applicant: SONY CORPORATION, Tokyo (JP)

(72) Inventor: Shinichi Fujii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 15/967,876

(22) Filed: May 1, 2018

(65) Prior Publication Data

US 2018/0249067 A1   Aug. 30, 2018

Related U.S. Application Data

(63) Continuation of application No. 14/847,400, filed on Sep. 8, 2015, now Pat. No. 9,986,146, which is a
(Continued)

(30) Foreign Application Priority Data

Nov. 28, 2006 (JP) .................................. 2006-319783

(51) Int. Cl.
*H04N 5/232* (2006.01)
*H04N 5/369* (2011.01)
*H04N 5/378* (2011.01)

(52) U.S. Cl.
CPC ..... *H04N 5/23212* (2013.01); *H04N 5/23293* (2013.01); *H04N 5/3696* (2013.01); *H04N 5/378* (2013.01)

(58) Field of Classification Search
CPC .......................... H04N 5/23212; H04N 5/3696
(Continued)

(56) References Cited

U.S. PATENT DOCUMENTS

| 4,783,383 A | 11/1988 | Machida et al. |
| 5,396,288 A | 3/1995 | Tsugita et al. |

(Continued)

FOREIGN PATENT DOCUMENTS

| EP | 1071147 A1 | 1/2001 |
| EP | 1175101 A1 | 1/2002 |

(Continued)

OTHER PUBLICATIONS

Non-Final Office Action for U.S. Appl. No. 14/847,400, dated Sep. 29, 2016, 11 pages.
(Continued)

*Primary Examiner* — Antoinette T Spinks
(74) *Attorney, Agent, or Firm* — Chip Law Group

(57) ABSTRACT

Herein disclosed is an imaging device having an imaging optical system, the device including: an imaging element configured to include a plurality of first pixels and a plurality of second pixels arranged along a predetermined direction; a first processor configured to execute focal detection processing by a phase difference detection system based on charge signals obtained from the plurality of second pixels; and a second processor configured to execute specific processing based on charge signals obtained from the plurality of first pixels, the specific processing being different from the focal detection processing by a phase difference detection system and being necessary for a function of the imaging device.

12 Claims, 12 Drawing Sheets

Related U.S. Application Data continuation of application No. 14/244,598, filed on Apr. 3, 2014, now Pat. No. 9,143,675, which is a continuation of application No. 11/983,962, filed on Nov. 13, 2007, now abandoned.

(58) Field of Classification Search
USPC .............................................. 348/345, 222.1
See application file for complete search history.

(56) References Cited

U.S. PATENT DOCUMENTS

| | | |
|---|---|---|
| 5,598,964 A | 2/1997 | Gore et al. |
| 6,225,778 B1 | 5/2001 | Hayama et al. |
| 6,597,868 B2 | 7/2003 | Suda |
| 6,750,437 B2 | 6/2004 | Yamashita et al. |
| 6,781,632 B1 | 8/2004 | Ide |
| 6,819,360 B1 | 11/2004 | Ide et al. |
| 6,829,008 B1 | 12/2004 | Kondo et al. |
| 6,897,899 B1 | 5/2005 | Ide et al. |
| 7,008,720 B2 | 3/2006 | Shimamura et al. |
| 7,822,334 B2 | 10/2010 | Ono et al. |
| 2001/0014215 A1 | 8/2001 | Ide et al. |
| 2002/0114015 A1 | 8/2002 | Fujii et al. |
| 2002/0121652 A1 | 9/2002 | Yamasaki |
| 2004/0001158 A1 | 1/2004 | Aoki |
| 2004/0070366 A1 | 4/2004 | Takeshita et al. |
| 2004/0240871 A1 | 12/2004 | Shinohara |
| 2005/0285967 A1 | 12/2005 | Suda |
| 2006/0165403 A1 | 7/2006 | Ito |
| 2007/0154200 A1 | 7/2007 | Utagawa et al. |
| 2007/0206940 A1 | 9/2007 | Kusaka |
| 2008/0259202 A1 | 10/2008 | Fujii |
| 2009/0096886 A1 | 4/2009 | Kusaka |
| 2009/0128671 A1 | 5/2009 | Kusaka |

FOREIGN PATENT DOCUMENTS

| | | |
|---|---|---|
| EP | 1353389 A2 | 10/2003 |
| EP | 1534003 A1 | 5/2005 |
| EP | 1713258 A2 | 10/2006 |
| JP | 63-259962 A | 10/1988 |
| JP | 2000-156823 A | 6/2000 |
| JP | 2000-292686 A | 10/2000 |
| JP | 2001-305415 A | 10/2001 |
| JP | 2002-245993 A | 8/2002 |
| JP | 2005-092085 A | 4/2005 |
| TW | 200622467 A | 7/2006 |

OTHER PUBLICATIONS

Non-Final Office Action for U.S. Appl. No. 14/847,400, dated Dec. 31, 2015, 5 pages.
Final Office Action for U.S. Appl. No. 14/847,400, dated Jun. 17, 2016, 11 pages.
Final Office Action for U.S. Appl. No. 14/847,400, dated May 10, 2015, 11 pages.
Advisory Action for U.S. Appl. No. 14/847,400, dated Aug. 25, 2016, 3 pages.
Advisory Action for U.S. Appl. No. 14/847,400, dated Jul. 19, 2017, 3 pages.
Notice of Allowance for U.S. Appl. No. 14/847,400, dated Jan. 30, 2018, 08 pages.
Non-Final Office Action for U.S. Appl. No. 14/244,598, dated Jun. 10, 2014, 09 pages.
Non-Final Office Action for U.S. Appl. No. 14/244,598, dated Jan. 13, 2015, 10 pages.
Final Office Action for U.S. Appl. No. 14/244,598, dated Sep. 19, 2014, 10 pages.
Final Office Action for U.S. Appl. No. 14/244,598, dated Mar. 23, 2015, 12 pages.
Notice of Allowance for U.S. Appl. No. 14/244,598, dated May 29, 2015, 08 pages.
Non-Final Office Action for U.S. Appl. No. 11/983,962, dated May 26, 2010, 08 pages.
Non-Final Office Action for U.S. Appl. No. 11/983,962, dated Apr. 10, 2012, 11 pages.
Non-Final Office Action for U.S. Appl. No. 11/983,962, dated Aug. 15, 2012, 12 pages.
Final Office Action for U.S. Appl. No. 11/983,962, dated Jan. 20, 2011, 11 pages.
Final Office Action for U.S. Appl. No. 11/983,962, dated Dec. 3, 2013, 11 pages.
Advisory Action for U.S. Appl. No. 11/983,962, dated Mar. 30, 2011, 03 pages.
Final Office Action for U.S. Appl. No. 11/983,962, dated Jan. 20, 2011, 10 pages.
Non-Final Office Action for U.S. Appl. No. 14/847,400, dated Sep. 7, 2017, 12 pages.

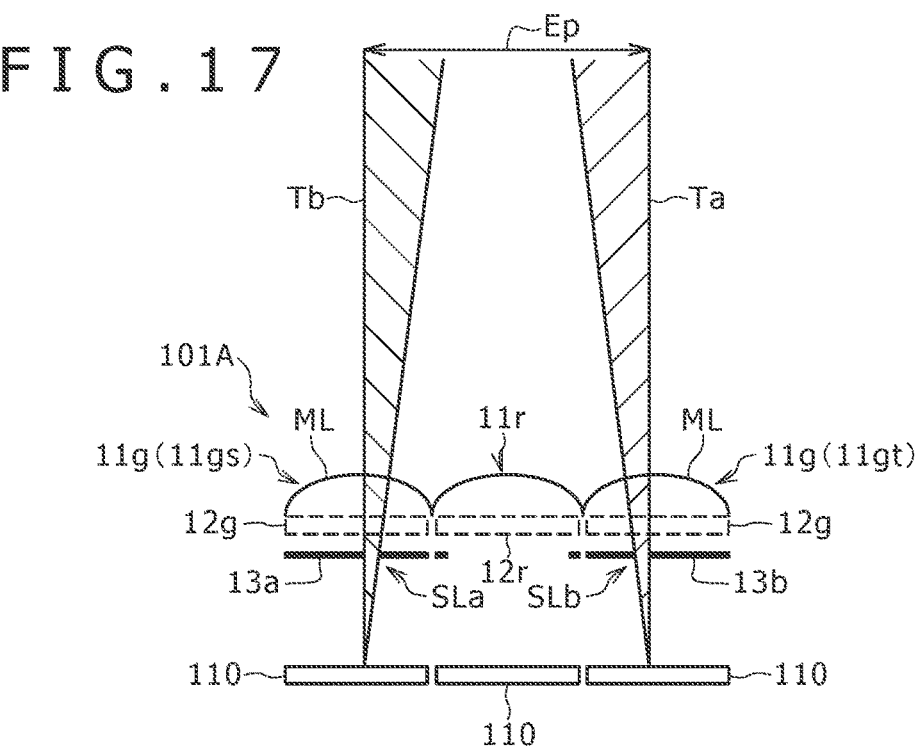
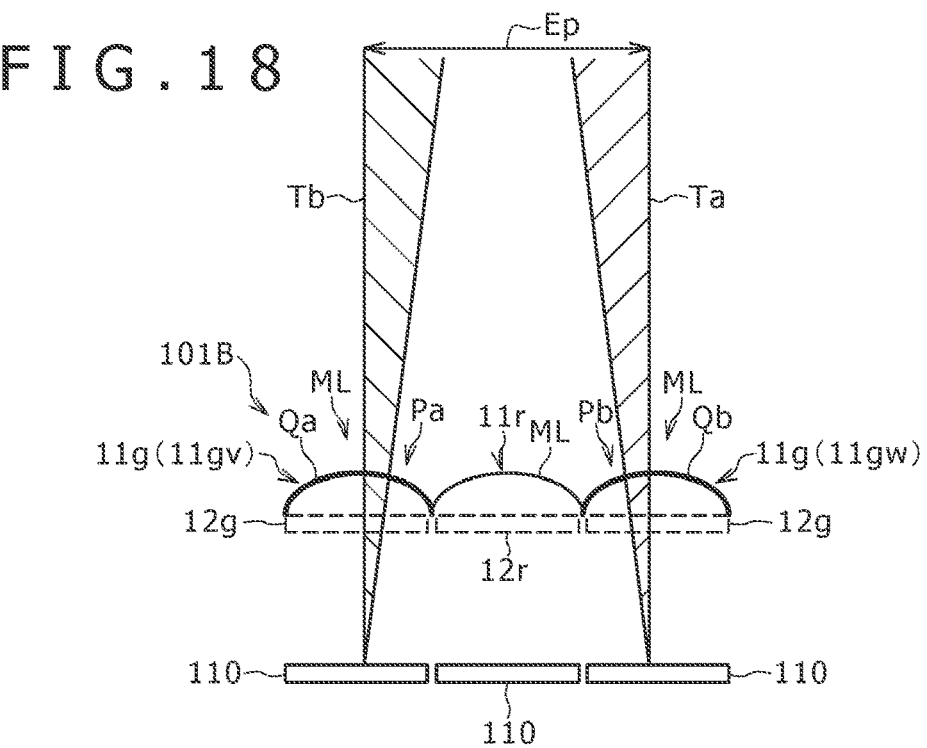

IMAGING DEVICE HAVING AUTOFOCUS CAPABILITY

CROSS REFERENCES TO RELATED APPLICATIONS

The present application is a continuation application of U.S. patent application Ser. No. 14/847,400, filed Sep. 8, 2015, which is a continuation application of U.S. patent application Ser. No. 14/244,598, filed Apr. 3, 2014, (now U.S. Pat. No. 9,143,675, which is a continuation application of U.S. patent application Ser. No. 11/983,962, filed Nov. 13, 2007, which claims priority from Japanese Patent Application JP 2006-319783 filed in the Japan Patent Office on Nov. 28, 2006, the entire contents of which being incorporated herein by reference.

BACKGROUND OF THE INVENTION

1. Field of the Invention

The present invention relates to an imaging device having an imaging optical system.

2. Description of the Related Art

As a technique in a digital camera (imaging device), a technique is known in which auto focus control by a phase difference detection system (hereinafter, referred to also as "phase difference AF") is implemented by using an imaging element that includes pixels each having divided inside and plural photoelectric converters (hereinafter, referred to also as "divided pixels").

For example, according to the technique disclosed in Japanese Patent Laid-open No. 2001-305415 (hereinafter, Patent Document 1), the respective photoelectric converters in pixels each divided into two areas receive light beams that have passed through different areas of the pupil of an imaging lens (imaging optical system) to thereby create a pair of image sequences, and the shift amount regarding this pair of image sequences is obtained, which allows the phase difference AF with use of an imaging element. Furthermore, Patent Document 1 discloses also a feature that AF control by a contrast detection system (hereinafter, referred to also as "contrast AF") is implemented by using outputs from the photoelectric converters in these divided pixels.

However, in the technique of Patent Document 1, the contrast AF is performed by using the divided pixels provided for the phase difference AF (pixels for phase difference AF). Therefore, there is a fear that the focusing accuracy of this contrast AF is lower than that of existing contrast AF. Specifically, in existing contrast AF, charge signals of non-divided pixels, of which inside is not divided, are utilized. In contrast, the respective photoelectric converters in divided pixels for receiving light beams that have passed through a part of the lens pupil have sensitivity lower than that of existing non-divided pixels. Accordingly, it is difficult for the contrast AF by use of the outputs of the divided pixels to ensure accuracy equal to that of existing contrast AF.

In addition, if auto exposure control (AE), auto white balance control (AWB), and so on are implemented based on the outputs of the divided pixels similarly to the above-described contrast AF, there is a fear that the accuracy of these specific controls necessary for camera functions is also lower than that of existing controls.

SUMMARY OF THE INVENTION

There is a need for the present invention to provide an imaging device that can execute specific processing necessary for camera functions other than phase difference AF with high accuracy by using an imaging element that has pixels for the phase difference AF.

According to an embodiment of the present invention, there is provided an imaging device having an imaging optical system. The device includes (a) an imaging element configured to include a plurality of first pixels and a plurality of second pixels arranged along a predetermined direction, (b) a first processor configured to execute focal detection processing by a phase difference detection system based on charge signals obtained from the plurality of second pixels, and (c) a second processor configured to execute specific processing based on charge signals obtained from the plurality of first pixels. The specific processing is different from the focal detection processing by a phase difference detection system and is necessary for a function of the imaging device. The plurality of first pixels receive a subject light beam that has passed through the entire area of the exit pupil of the imaging optical system, and the plurality of second pixels receive subject light beams that have passed through a pair of partial areas of the exit pupil. The first processor creates a pair of image sequences based on charge signals from the second pixels that receive subject light beams that have passed through the pair of partial areas, and detects the amount of shift along the predetermined direction regarding the pair of image sequences, to thereby execute the focal detection processing by a phase difference detection system.

According to the embodiment of the present invention, focal detection processing by a phase difference detection system is executed based on charge signals obtained from the plurality of second pixels that receive subject light beams that have passed through a pair of partial areas of the exit pupil of the imaging optical system. Furthermore, based on charge signals obtained from the plurality of first pixels that receive a subject light beam that has passed through the entire area of the exit pupil of the imaging optical system, specific processing that is different from the focal detection processing by a phase difference detection system and is necessary for a function of the imaging device is executed. As a result, by using an imaging element having pixels (the above-described second pixels) for phase difference AF, specific processing necessary for camera functions other than the phase difference AF can be executed with high accuracy.

BRIEF DESCRIPTION OF THE DRAWINGS

FIG. 17 is a diagram for explaining the configuration of an imaging element 101A according to a modification example of the present invention; and FIG. 18 is a diagram for explaining the configuration of an imaging element 101B according to another modification example.

DETAILED DESCRIPTION OF THE PREFERRED EMBODIMENTS

<Appearance Configuration of Imaging Device>

Figure 1:
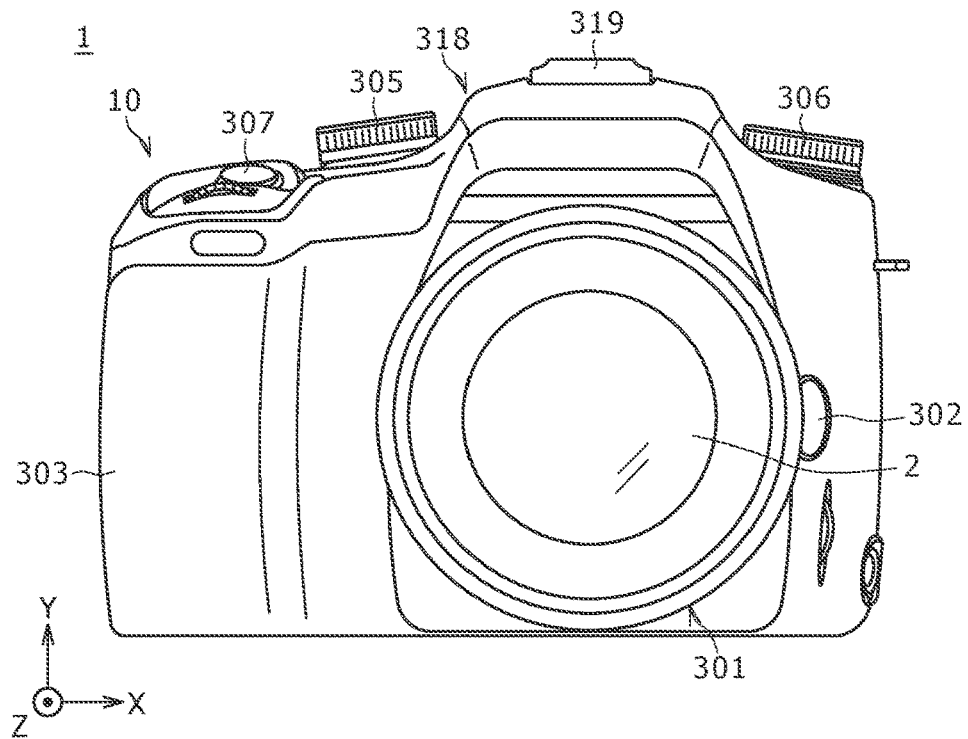
FIG. 1 is a diagram showing the appearance configuration of an imaging device 1 according to an embodiment of the present invention.
Figure 2:
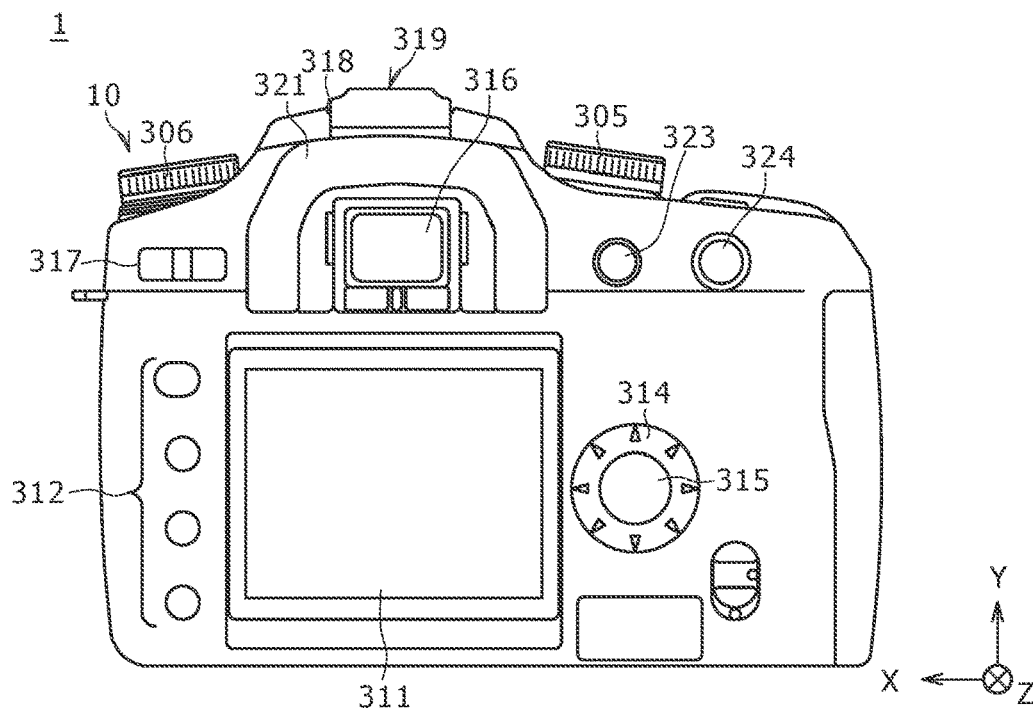
FIG. 2 is a diagram showing the appearance configuration of the imaging device 1.
Figure 3:
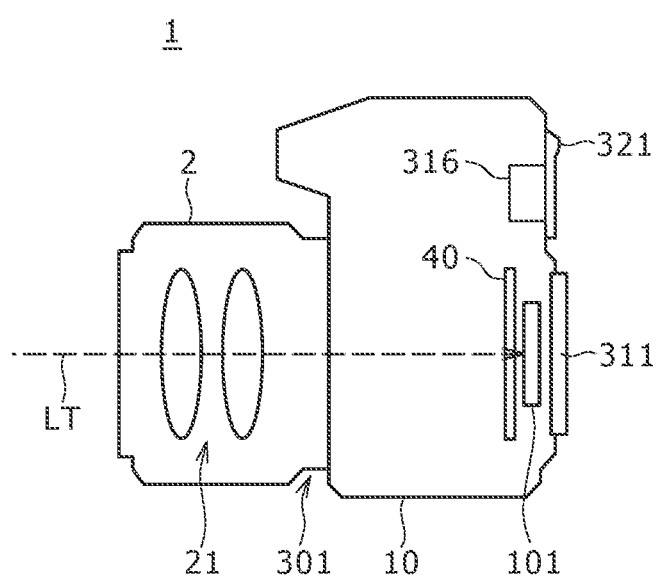
FIG. 3 is a vertical sectional view of the imaging device 1.

FIGS. 1 and 2 are diagrams showing the appearance configuration of an imaging device 1 according to an embodiment of the present invention. FIGS. 1 and 2 are front view and rear view, respectively. FIG. 3 is a vertical sectional view of the imaging device 1.

The imaging device 1 is configured as e.g. a single-lens reflex digital still camera, and includes a camera body 10 and an imaging lens 2 as an interchangeable lens that can be freely detached from the camera body 10.

Referring to FIG. 1, the following parts are provided on the front face side of the camera body 10: a mount part 301 that is disposed at substantially the center of the camera front face and on which the imaging lens 2 is mounted; a lens interchange button 302 disposed at the right of the mount part 301; a grip part 303 that is provided in a protruding manner at the left end of the camera front face (left side with respect to the X direction) and allows a user to surely grasp the camera with one hand (or both hands); a mode setting dial 305 disposed at upper left part of the camera front face (upper left side with respect to the Y direction); a control value setting dial 306 disposed at upper right part of the camera front face; and a shutter button 307 disposed on the top face of the grip part 303.

Referring to FIG. 2, the following parts are provided on the rear face side of the camera body 10: a liquid crystal display (LCD) 311; a setting button group 312 disposed at the left of the LCD 311; an arrow key 314 disposed at the right of the LCD 311; and a push button 315 disposed at the center of the arrow key 314. Furthermore, the following parts are also provided on the rear face side of the camera body 10: an electronic view finder (EVF) 316 disposed above the LCD 311; an eyecup 321 surrounding the EVF 316; a main switch 317 disposed at the left of the EVF 316; an exposure correction button 323 and an AE lock button 324 that are disposed at the right of the EVF 316; and a flash part 318 and a connection terminal 319 that are provided above the EVF 316.

On the mount part 301, plural electric contacts for electric connection to the mounted imaging lens 2, couplers for mechanical connection, and so on are provided.

The lens interchange button 302 is pushed down at the time of removal of the imaging lens 2 mounted on the mount part 301.

The grip part 303 is to allow a user to grasp the imaging device 1 at the time of imaging, and is provided with surface undulation in matching with the finger shape for higher fitting property. Inside the grip part 303, a cell holder and card holder (not shown) are provided. In the cell holder, a cell 69B (see FIG. 4) is housed as a camera power source. In the card holder, a recording medium (e.g., memory card) for recording the image data of captured images is detachably housed. The grip part 303 may be provided with a grip sensor for detecting whether or not the grip part 303 is grasped by a user.

The mode setting dial 305 and the control value setting dial 306 are formed of a member that has a substantially circular disk shape and can rotate in a plane substantially parallel to the top face of the camera body 10. The mode setting dial 305 is to select one of modes and functions incorporated in the imaging device 1, such as an auto exposure (AE) control mode, an auto focus (AF) control mode, various imaging modes typified by a still image mode for capturing one still image and a continuous imaging mode for performing continuous imaging, and a reproduction mode for reproducing recorded images. The control value setting dial 306 is to set control values for the various functions incorporated in the imaging device 1.

The shutter button 307 is a push-down switch that can be halfway pushed down so as to be in the "halfway-pushed state" and can be further pushed down so as to be in the "fully-pushed state". When the shutter button 307 is halfway pushed (S1) in a still image mode, preparation operation for capturing a still image of a subject (preparation operation such as setting of the exposure control value and focus adjustment) is executed. When the shutter button 307 is fully pushed (S2), imaging operation (a series of operation including exposure of an imaging sensor, predetermined image processing for an image signal obtained through the exposure, and recording in a memory card or the like) is executed.

The LCD 311 includes a color liquid crystal panel that can display images. The LCD 311 is to display an image captured by an imaging element 101 (FIG. 3) and a reproduced image that has been recorded, and is to display a setting screen for the functions and modes incorporated in the imaging device 1. Instead of the LCD 311, an organic EL display or plasma display may be used.

The setting button group 312 includes buttons that allow operation for the various functions incorporated in the imaging device 1. Specifically, the setting button group 312 includes e.g. a selection settlement switch for settling the details selected on a menu screen displayed on the LCD 311, selection cancel switch, menu displaying switch for a change of the contents of the menu screen, displaying ON/OFF switch, and displaying enlargement switch.

The arrow key 314 is formed of an annular member that has plural push-down parts (triangle-mark parts in the drawing) disposed along the circumferential direction with a constant interval, and is so configured that pressing operation for the push-down parts is detected through contacts (switches, not shown) provided corresponding to the respective push-down parts. The push button 315 is disposed at the center of the arrow key 314. The arrow key 314 and the push button 315 are used to input instructions regarding a change of the imaging magnification (movement of the zoom lens in the wide direction and tele direction), frame stepping of a recorded image to be reproduced on the LCD 311 or the like, setting of imaging conditions (diaphragm value, shutter speed, the presence or absence of flash lighting, etc.), and so on.

The EVF 316 includes e.g. a color liquid crystal panel that can display images, and is to display an image captured by the imaging element 101 (FIG. 3) and a reproduced image that has been recorded. On the EVF 316 and the LCD 311, live-view (preview) displaying is performed in which a subject is displayed in a moving image manner based on image signals sequentially created by the imaging element 101 before actual imaging (imaging for image recording). This permits a user to visually recognize the subject to be actually imaged by the imaging element 101.

The main switch 317 is formed of a dual-contact slide switch that laterally slides. When the main switch 317 is set to the left, the power supply of the imaging device 1 is turned on. When the main switch 317 is set to the right, the power supply is turned off.

The flash part 318 is configured as a pop-up built-in flash. When an external flash or the like is attached to the camera body 10, the connection terminal 319 is used for the connection.

The eyecup 321 is a U-character shaped light-shielding member that suppresses the entry of external light into the EVF 316.

The exposure correction button 323 is to manually adjust the exposure value (diaphragm value and shutter speed), and the AE lock button 324 is to fix exposure.

The imaging lens 2 functions as a lens window that captures light (optical image) from a subject, and functions also as an imaging optical system for guiding the subject light to the imaging element 101 disposed inside the camera body 10. By pushing down the above-described lens interchange button 302, the imaging lens 2 can be removed from the camera body 10.

The imaging lens 2 includes a lens group 21 composed of plural lenses that are serially arranged along an optical axis LT (FIG. 3). This lens group 21 includes a focus lens 211 (see FIG. 4) for adjustment of the focal point and a zoom lens 212 (see FIG. 4) for magnification changes. These lenses are driven in the direction of the optical axis LT, so that the magnification change and focal adjustment are performed. Furthermore, at a proper position on the outer circumference of the lens barrel of the imaging lens 2, an operating ring that can rotate along the outer circumferential plane of the lens barrel is provided. In response to manual or auto operation, the zoom lens 212 moves in the optical axis direction depending on the rotation direction and rotation amount of the operating ring, so that the zoom magnification (imaging magnification) is set to the value corresponding to the position of the lens movement destination.

The imaging element 101 is disposed on the optical axis LT of the lens group 21 included in the imaging lens 2 mounted on the camera body 10 in such a manner as to be perpendicular to the optical axis LT. As the imaging element 101, a Bayer-arrangement CMOS color area sensor (CMOS imaging element) is used, in which plural pixels each having e.g. a photodiode are two-dimensionally arranged in a matrix and e.g. red (R), green (G), and blue (B) color filters having different spectroscopic characteristics are provided at the ratio of 1:2:1 on the light-receiving planes of the respective pixels. The imaging element (imaging sensor) 101 converts an optical image of a subject formed through the lens group 21 into analog electric signals (image signals) of the respective color components of R, G, and B, and outputs the signals as R, G, and B image signals. The configuration of this imaging element 101 will be described in detail later.

In front of the imaging element 101, a shutter unit 40 is disposed. This shutter unit 40 has a film body that vertically moves, and is configured as a mechanical focal plane shutter that carries out operations of opening and blocking the optical path of subject light guided to the imaging element 101 along the optical axis LT. The shutter unit 40 can be omitted if the imaging element 101 can be fully electronically shuttered.

<Electric Configuration of Imaging Device 1>

Figure 4:
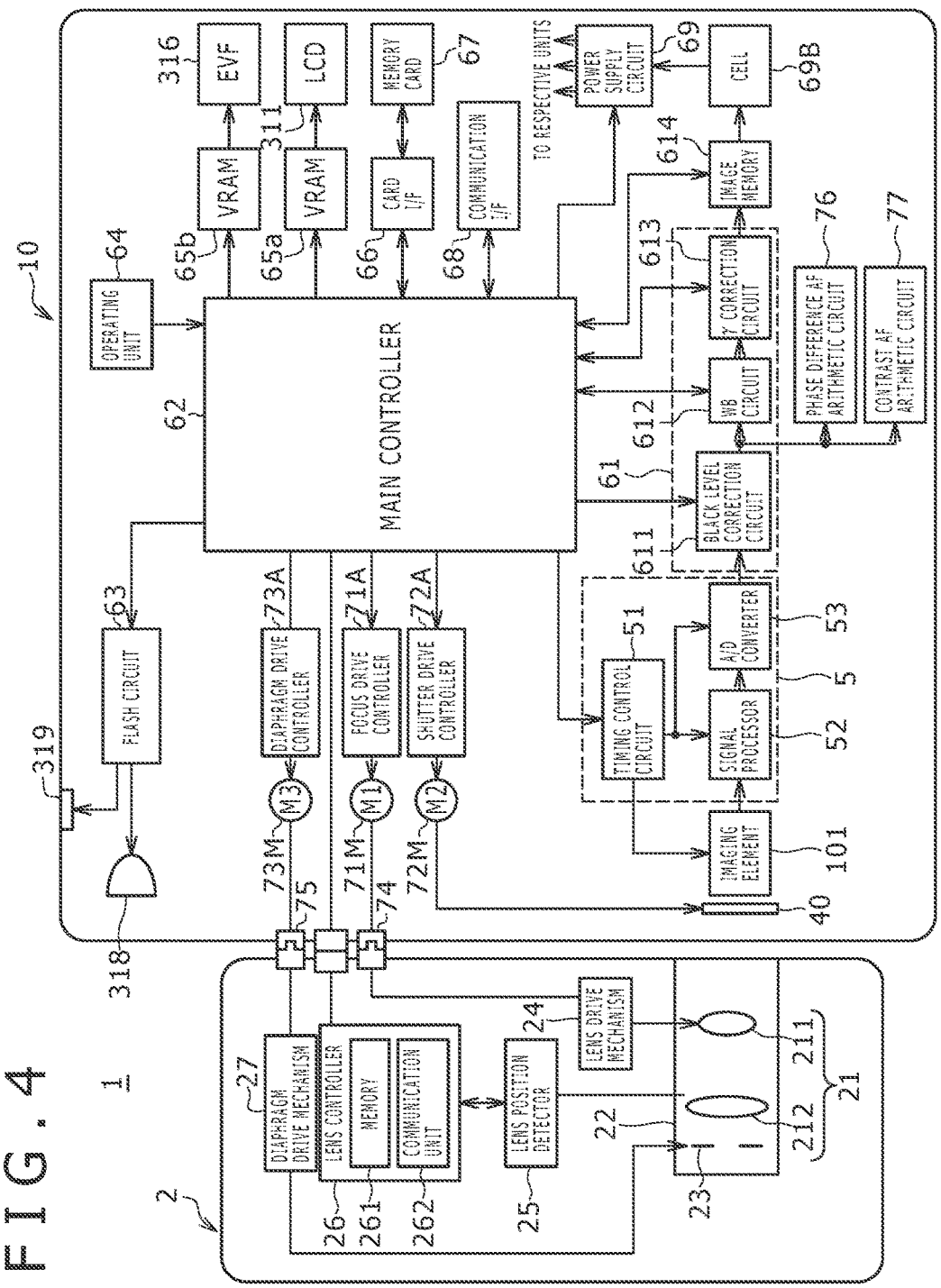
FIG. 4 is a block diagram showing the electric configuration of the whole of the imaging device 1.

FIG. 4 is a block diagram showing the electric configuration of the whole of the imaging device 1. The same members and so on in FIG. 4 as those in FIGS. 1 to 3 are given the same numerals. For convenience of description, initially the electric configuration of the imaging lens 2 will be described below.

In addition to the lens group 21 serving as the above-described imaging optical system, the imaging lens 2 includes a lens drive mechanism 24, a lens position detector 25, a lens controller 26, and a diaphragm drive mechanism 27.

For the lens group 21, the focus lens 211, the zoom lens 212, and a diaphragm 23 for adjusting the amount of light incident on the imaging element 101 provided in the camera body 10 are held in the lens barrel along the direction of the optical axis LT (FIG. 3). This allows capturing of an optical image of a subject and formation of the optical image on the imaging element 101. The focal adjustment operation is carried out through driving of the lens group 21 in the direction of the optical axis LT by an AF actuator 71M in the camera body 10.

The lens drive mechanism 24 is formed of e.g. a helicoid and a gear (not shown) for rotating the helicoid. The lens drive mechanism 24 receives driving force from the AF actuator 71M via a coupler 74 to thereby move the focus lens 211 and so on in the direction parallel to the optical axis LT. The movement direction and movement amount of the focus lens 211 conform to the rotation direction and the number of rotations, respectively, of the AF actuator 71M.

The lens position detector 25 includes an encode plate on which plural code patterns are formed along the direction of the optical axis LT with a predetermined pitch within the movement range of the lens group 21, and an encoder brush that moves integrally with the lens barrel 22 in such a manner as to be in sliding contact with the encode plate. The lens position detector 25 detects the movement amount of the lens group 21 at the time of focal adjustment. The lens position detected by the lens position detector 25 is output as e.g. the number of pulses.

The lens controller 26 is formed of e.g. a microcomputer that includes a ROM storing therein a control program and a memory 261 formed of a flash memory or the like storing therein data relating to status information. Furthermore, the lens controller 26 includes a communication unit 262 that communicates with a main controller 62 in the camera body 10. This communication unit 262 transmits to the main controller 62 e.g. status information data such as the focal length, exit pupil position, diaphragm value, focus distance, and peripheral light amount status of the lens group 21. On the other hand, the communication unit 262 receives e.g. the drive amount of the focus lens 211 from the main controller 62. Furthermore, at the time of imaging, data such as focal length information and diaphragm value obtained after the completion of AF operation are transmitted from the communication unit 262 to the main controller 62. In the memory 261, the above-described status information data of the lens group 21, data of e.g. the drive amount of the focus lens 211 transmitted from the main controller 62, and so on are stored.

The diaphragm drive mechanism 27 receives driving force from a diaphragm drive actuator 73M via a coupler 75 to thereby change the diaphragm diameter of the diaphragm 23.

The electric configuration of the camera body 10 will be described below. In addition to the above-described imaging element 101, shutter unit 40, and so on, the camera body 10 includes an analog front-end (AFE) 5, an image processor 61, an image memory 614, the main controller 62, a flash circuit 63, an operating unit 64, VRAMs 65 (65a and 65b), a card I/F 66, a memory card 67, a communication I/F 68, a power supply circuit 69, the cell 69B, a focus drive controller 71A, the AF actuator 71M, a shutter drive controller 72A, a shutter drive actuator 72M, a diaphragm drive controller 73A, and the diaphragm drive actuator 73M.

The imaging element 101 is formed of a CMOS color area sensor as described above. A timing control circuit 51 to be described later controls imaging operation such as the start (and end) of exposure operation of the imaging element 101, selection of the outputs of the respective pixels included in the imaging element 101, and reading-out of pixel signals.

The AFE 5 supplies the imaging element 101 with a timing pulse for causing the imaging element 101 to carry out predetermined operation. Furthermore, the AFE 5 executes predetermined signal processing for an image signal (group of analog signals received by the respective pixels of the CMOS area sensor) output from the imaging element 101, to thereby convert the signal into a digital signal and output it to the image processor 61. This AFE 5 includes the timing control circuit 51, a signal processor 52, and an A/D converter 53.

The timing control circuit 51 produces predetermined timing pulses (vertical scan pulse φVn, horizontal scan pulse φVm, and pulses for generating a reset signal φVr and so on) based on a reference clock output from the main controller 62, and outputs the timing pulses to the imaging element 101 for control of the imaging operation of the imaging element 101. In addition, the timing control circuit 51 outputs predetermined timing pulses to the signal processor 52 and the A/D converter 53 to thereby control the operation of the signal processor 52 and the A/D converter 53.

The signal processor 52 executes predetermined analog signal processing for an analog image signal output from the imaging element 101. This signal processor 52 includes a correlated double sampling (CDS) circuit, an auto gain control (AGC) circuit for amplifying a charge signal output from the imaging element 101, a clamp circuit, and so on.

In the AGC circuit of the signal processor 52, charge signals from divided G pixels 11gr to be described later are amplified with a gain (amplification factor) α, and charge signals from non-divided pixels (G pixels 11gb, R pixels 11r, and B pixels 11b) to be described later are amplified with a gain β different from the gain α. The reason for this amplification with different gains is that the sensitivity of the divided G pixels, which receive light beams that have passed through a part of the exit pupil of the imaging lens 2, is lower than that of the non-divided pixels, and thus there is a need to amplify signals from the divided G pixels with a gain higher than that for the non-divided pixels to thereby ensure a proper output level.

The A/D converter 53 converts analog R, G, and B image signals output from the signal processor 52 into a digital image signal composed of plural bits (e.g., 12 bits) based on the timing pulse output from the timing control circuit 51.

The image processor 61 executes predetermined signal processing for image data output from the AFE 5 to thereby create an image file, and includes a black level correction circuit 611, a white balance control circuit 612, and a gamma correction circuit 613. Image data loaded in the image processor 61 is written to the image memory 614 in synchronization with reading from the imaging element 101, and from then on the image processor 61 accesses this image data written to the image memory 614 for processing in the respective blocks in the image processor 61.

The black level correction circuit 611 corrects the black level of the R, G, and B digital image signals arising from the A/D conversion by the A/D converter 53 to a reference black level.

The white balance correction circuit 612 carries out level conversion (white balance (WB) adjustment) for the digital signals of the respective color components of R, G, and B based on the reference white dependent upon the light source. Specifically, based on WB adjustment data given from the main controller 62, the white balance correction circuit 612 specifies from an imaging subject a part that is estimated to be originally white based on luminance, chroma, and other data. Furthermore, the white balance correction circuit 612 calculates, regarding the specified part, the average of the R, G, and B color components, the G/R ratio, and the G/B ratio, and carries out level correction by using the calculated parameters as the correction gains for R and B.

The gamma correction circuit 613 corrects the grayscale characteristic of the image data of which WB is adjusted. Specifically, the gamma correction circuit 613 carries out nonlinear transform and offset adjustment by using a gamma correction table in which the level of image data is set in advance for each color component.

At the time of the imaging mode, the image memory 614 temporarily stores therein image data output from the image processor 61, and is used as a work area for predetermined processing by the main controller 62 for this image data. Furthermore, at the time of the reproduction mode, image data read out from the memory card 67 is temporarily stored in the image memory 614.

The main controller 62 is formed of e.g. a microcomputer that includes a ROM storing therein a control program and a memory such as a flash memory temporarily storing therein data. The main controller 62 controls the operation of the respective units in the imaging device 1.

Furthermore, for the imaging element 101, the main controller 62 controls pixel reading of two kinds of modes (live-view read mode and AF read mode).

In the live-view read mode of the imaging element 101, the cycle (frame rate) of the pixel reading is set to 60 fps. Furthermore, decimation-reading of pixels is carried out for the imaging element 101, so that e.g. an image of 640×480 pixels in the VGA size is created as an image for live-view displaying. In this decimation-reading, the non-divided pixels to be described later (the non-divided G pixels 11gb, the R pixels 11r, and the B pixels 11b) are read out. The images created through the decimation-reading from the imaging element 101 are sequentially displayed on the EVF 316 (or the LCD 311), so that live-view displaying of a subject is performed.

In the AF read mode of the imaging element 101, auto focus control is carried out in such a way that the cycle (frame rate) of the pixel reading is set to 240 fps and the divided G pixels 11*gr* and the non-divided G pixels 11*gb* to be described later are read out. Also in the AF read mode, live-view displaying is performed by reading out at 60 fps the non-divided G pixels 11*gb*, the R pixels 11*r*, and the B pixels 11*b* from the imaging element 101.

The flash circuit 63 regulates, in the flash imaging mode, the light emission amount of the flash part 318 or an external flash connected to the connection terminal 319 to the light emission amount designed by the main controller 62.

The operating unit 64 includes the above-described mode setting dial 305, control value setting dial 306, shutter button 307, setting button group 312, arrow key 314, push button 315, main switch 317, and so on. The operating unit 64 is used to input operation information to the main controller 62.

The VRAMs 65*a* and 65*b* have memory capacity for image signals corresponding to the numbers of pixels of the LCD 311 and the EVF 316, and serve as buffer memories between the main controller 62 and the LCD 311 and the EVF 316. The card I/F 66 is an interface for permitting signal transmission/reception between the memory card 67 and the main controller 62. The memory card 67 is a recording medium in which image data created by the main controller 62 is stored. The communication I/F 68 is an interface for allowing image data and so on to be transmitted to a personal computer and other external apparatuses.

The power supply circuit 69 is formed of e.g. a constant voltage circuit, and produces voltage (e.g., 5 V) for driving the entire imaging device 1, including control units such as the main controller 62, the imaging element 101, and other various drive units. The energization of the imaging element 101 is controlled based on a control signal supplied from the main controller 62 to the power supply circuit 69. The cell 69B is a primary cell such as an alkaline dry cell or a secondary cell such as a nickel hydride rechargeable battery, and serves as a power source for supplying the entire imaging device 1 with power.

The focus drive controller 71A creates, based on an AF control signal given from the main controller 62, a drive control signal for the AF actuator 71M necessary to move the focus lens 211 to the focus position. The AF actuator 71M is formed of a stepping motor or the like, and gives lens driving force to the lens drive mechanism 24 of the imaging lens 2 via the coupler 74.

The shutter drive controller 72A creates a drive control signal for the shutter drive actuator 72M based on a control signal given from the main controller 62. The shutter drive actuator 72M drives the shutter unit 40 so that the shutter unit 40 can be opened and closed.

The diaphragm drive controller 73A creates a drive control signal for the diaphragm drive actuator 73M based on a control signal given from the main controller 62. The diaphragm drive actuator 73M gives driving force to the diaphragm drive mechanism 27 via the coupler 75.

The camera body 10 further includes a phase difference AF arithmetic circuit 76 and a contrast AF arithmetic circuit 77 that perform arithmetic operation necessary at the time of auto focus (AF) based on image data of which black level has been corrected, output from the black level correction circuit 611.

A detailed description will be made below about AF operation of the imaging device 1 by use of the phase difference AF arithmetic circuit 76 and the contrast AF arithmetic circuit 77.

<AF Operation of Imaging Device 1>

The imaging device 1 is configured to allow AF by a phase difference detection system (phase difference AF), in which the imaging element 101 receives light that has been transmitted (has passed) through different parts of the exit pupil to thereby detect the focal point. The configuration of this imaging element 101 and the principle of the phase difference AF employing the imaging element 101 will be described below.

Figure 5:
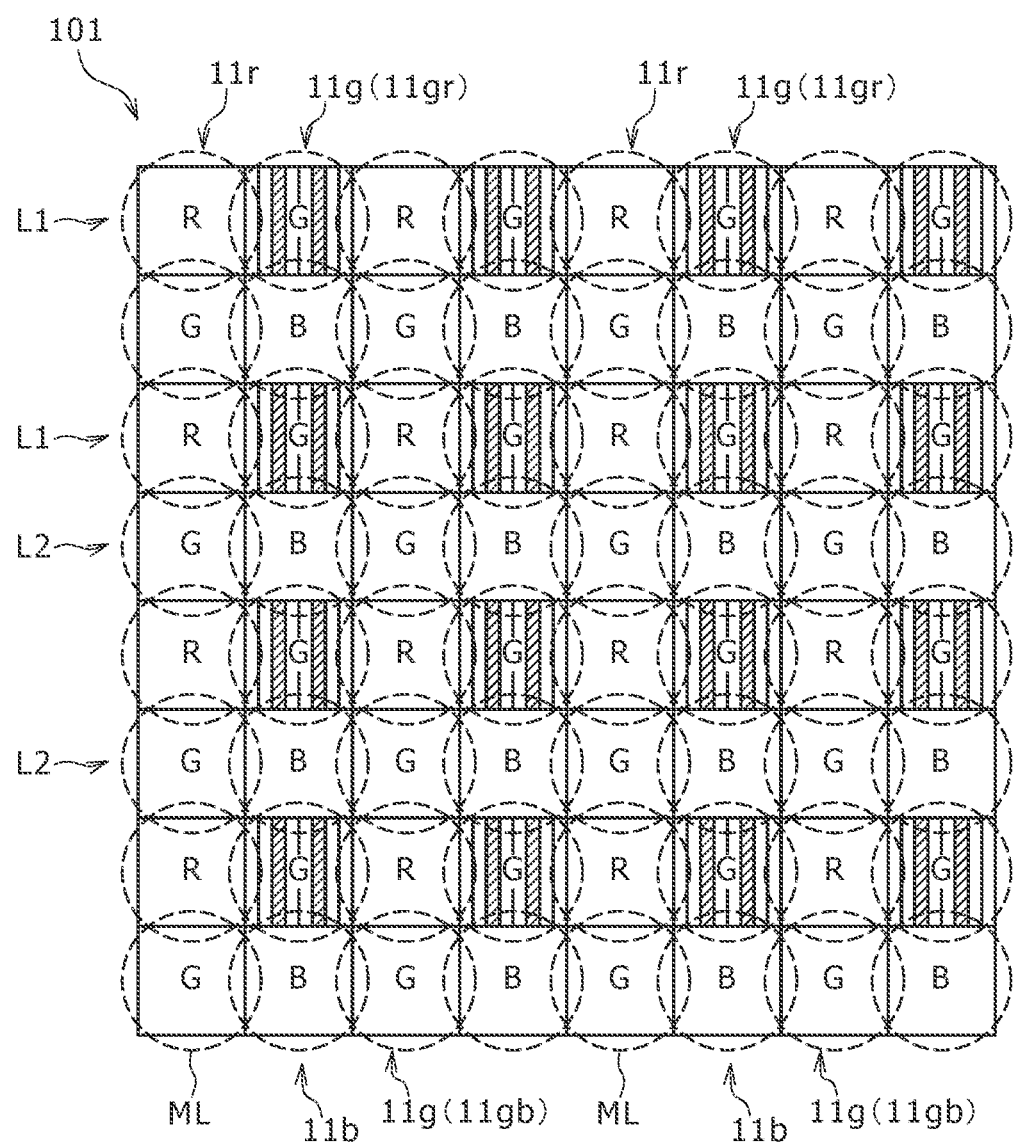
FIG. 5 is a diagram for explaining the configuration of an imaging element 101.

FIG. 5 is a diagram for explaining the configuration of the imaging element 101.

The imaging element 101 has red (R) pixels 11*r*, green (G) pixels 11*g*, and blue (B) pixels 11*b* in which color filters of R, G, and B, respectively, are provided on photodiodes. For each of the pixels 11 (11*r*, 11*g*, 11*b*), one microlens ML is provided. For convenience of illustration, adjacent microlenses ML overlap with each other in FIG. 5. However, in a practical imaging element, the microlenses ML are arranged without overlapping.

Figure 6:
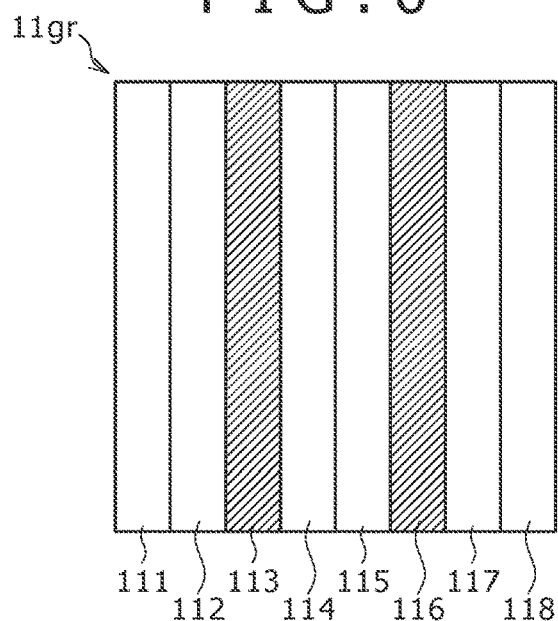
FIG. 6 is a diagram for explaining the configuration of a G pixel 11gr having divided inside.

The G pixels 11*g* include plural G pixels 11*gr* arranged along the direction of Gr lines L1 (horizontal direction) and plural G pixels 11*gb* arranged along Gb lines L2. In each of the G pixels 11*gr* on the Gr lines L1, the pixel inside is divided into eight areas along the direction of the Gr lines L1. Specifically, as shown in FIG. 6, in the G pixel 11*gr*, eight photoelectric converters 111 to 118 are arranged along the direction of the Gr line L1. Each of the photoelectric converters 111 to 118 has an independent photodiode, which permits reading out of accumulated charges through photoelectric conversion. In the charge reading from the imaging element 101, the charge reading from the G pixels 11*gr*, of which inside is divided, and that from the other non-divided pixels (the G pixels 11*gb*, the R pixels 11*r*, and the B pixels 11*b*) can be simultaneously carried out in such a way that the reading method for the G pixels 11*gr* is made different from that for the other non-divided pixels. Hereinafter, the G pixel 11*gr*, of which inside is divided, will be referred to as "divided G pixel" (referred to also as "divided pixel" simply). On the other hand, the G pixel 11*gb*, of which inside is not divided, will be referred to as "non-divided G pixel" (referred to also as "non-divided pixel" simply).

The principle of the phase difference AF by use of the imaging element 101 having the above-described divided G pixels 11*gr* will be described in detail below.

Figure 7:
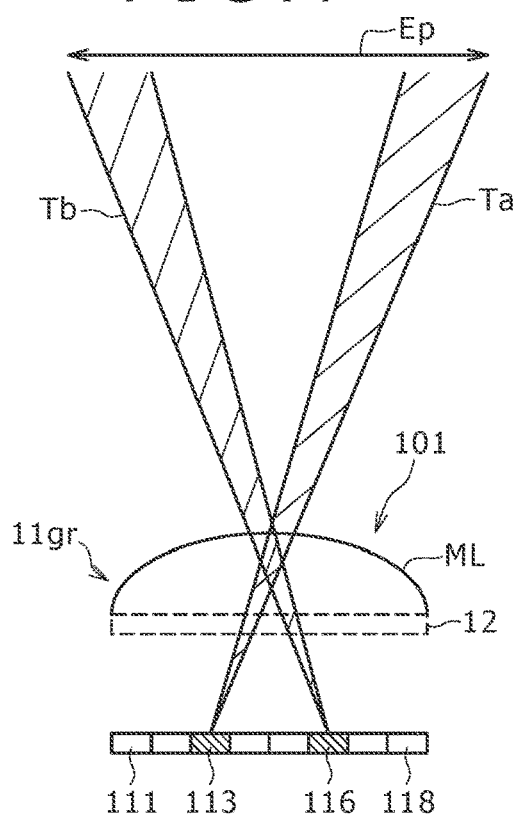
FIG. 7 is a diagram for explaining the principle of phase difference AF employing the imaging element 101.

FIG. 7 is a diagram for explaining the principle of the phase difference AF employing the imaging element 101.

The description of the principle is based on the following assumption. Specifically, when the actual diaphragm of the imaging lens (imaging optical system) 2 is equivalent to e.g. F5.6, in the divided G pixel 11*gr*, a light beam Ta that has passed through a right-side part of an exit pupil Ep passes through a green color filter 12 and forms an image on the photoelectric converter 113, which is the third converter from the left end of the divided G pixel 11*gr*. On the other hand, a light beam Tb that has passed through a left-side part of the exit pupil Ep passes through the green color filter 12 and forms an image on the photoelectric converter 116, which is the fifth converter from the left end (third converter from the right end) of the divided G pixel 11*gr*. That is, in contrast to the plural non-divided pixels including the non-divided G pixels 11*gb*, the R pixels 11*r*, and the B pixels 11*b*, which receive a subject light beam that has passed through the entire area of the exit pupil Ep of the imaging lens 2, the plural divided G pixels 11gr receive the subject light beams Ta and Tb that have passed through a pair of partial areas of the exit pupil Ep of the imaging lens 2. Hereinafter, light-reception data obtained from the photoelectric converter 113 will be referred to as "A-series data", while light-reception data obtained from the photoelectric converter 116 will be referred to as "B-series data". In the following, the principle of the phase difference AF will be described with reference to FIGS. 8 to 12 showing the A-series data and B-series data obtained from plural divided G pixels 11gr arranged on one Gr line L1 (FIG. 5).

Figure 8:
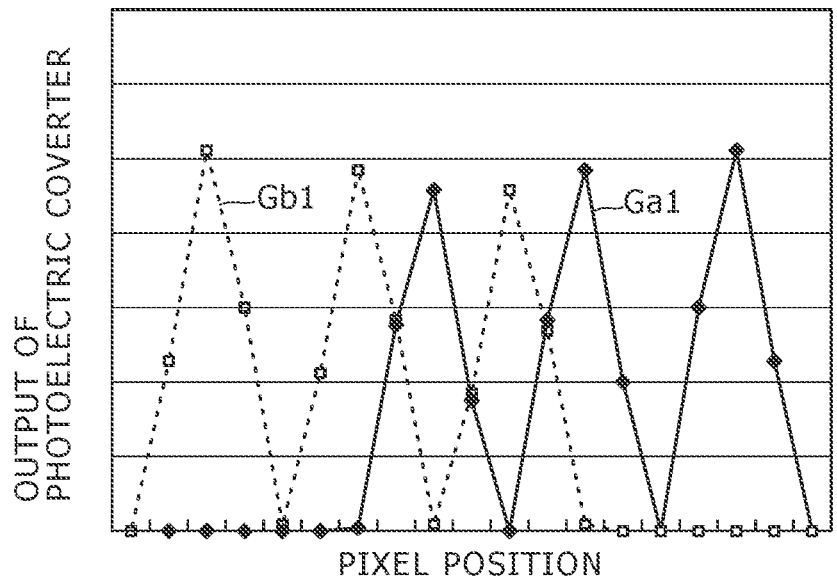
FIG. 8 is a diagram showing a simulation result when the focal plane is defocused to the 200-μm-closer side from the imaging plane of the imaging element 101.
Figure 9:
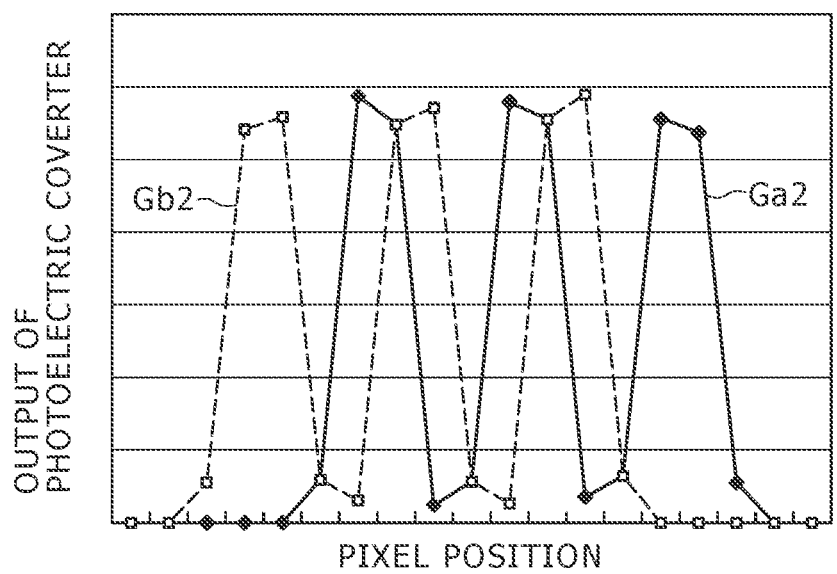
FIG. 9 is a diagram showing a simulation result when the focal plane is defocused to the 100-μm-closer side from the imaging plane.
Figure 10:
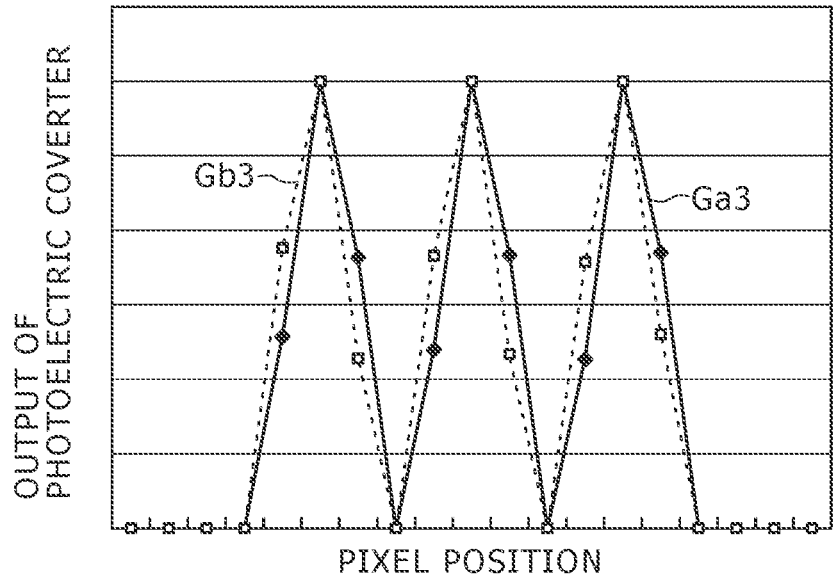
FIG. 10 is a diagram showing a simulation result of the focused state in which the focal plane corresponds with the imaging plane.
Figure 11:
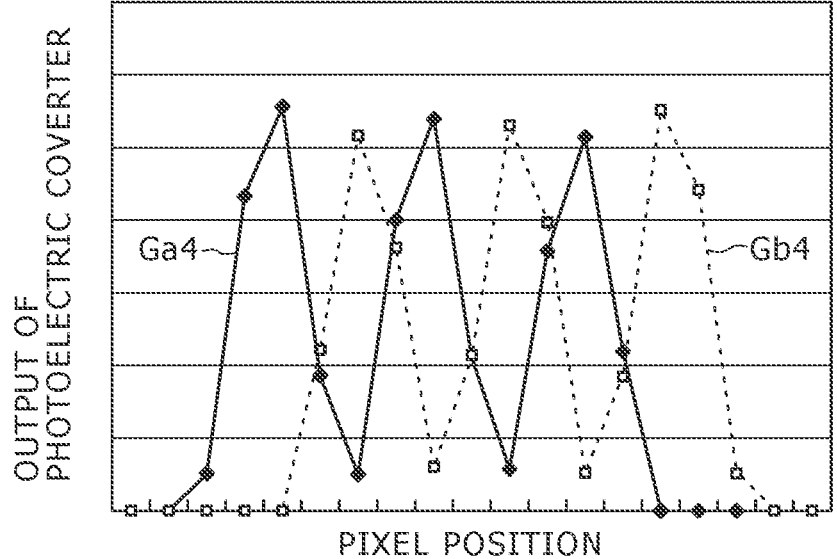
FIG. 11 is a diagram showing a simulation result when the focal plane is defocused to the 100-μm-remoter side from the imaging plane.
Figure 12:
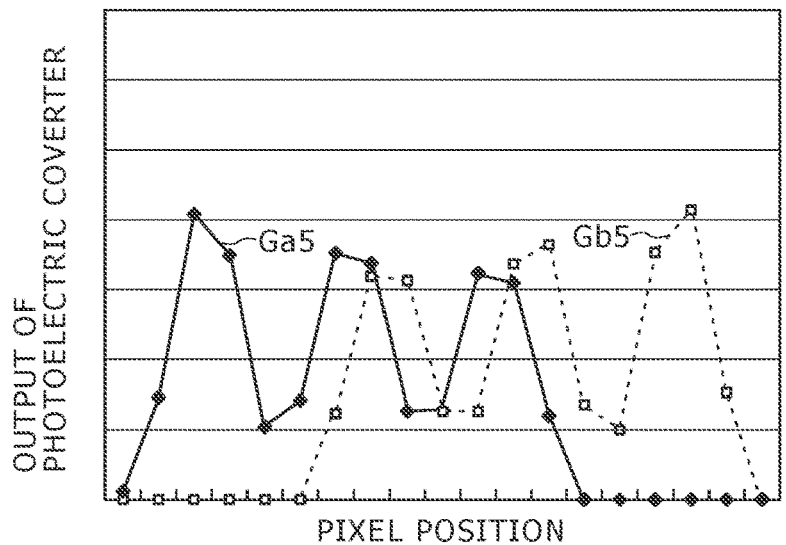
FIG. 12 is a diagram showing a simulation result when the focal plane is defocused to the 200-μm-remoter side from the imaging plane.

FIG. 8 is a diagram showing a simulation result when the focal plane is defocused to the 200-μm-closer side from the imaging plane of the imaging element 101. FIG. 9 is a diagram showing a simulation result when the focal plane is defocused to the 100-μm-closer side from the imaging plane. FIG. 10 is a diagram showing a simulation result of the focused state in which the focal plane corresponds with the imaging plane. FIG. 11 is a diagram showing a simulation result when the focal plane is defocused to the 100-μm-remoter side from the imaging plane. FIG. 12 is a diagram showing a simulation result when the focal plane is defocused to the 200-μm-remoter side from the imaging plane. In FIGS. 8 to 12, the abscissa indicates the positions of the divided G pixels 11gr with respect to the direction of the Gr line L1, while the ordinate indicates outputs from the photoelectric converters 113 and 116. In addition, in FIGS. 8 to 12, graphs Ga1 to Ga5 (represented by full lines) indicate the A-series data, while graphs Gb1 to Gb5 (represented by dashed lines) indicate the B-series data.

Comparison between the respective A-series image sequences and the respective B-series image sequences, which are indicated by the A-series graphs Ga1 to Ga5 and the B-series graphs Gb1 to Gb5 in FIGS. 8 to 12, makes it apparent that a larger defocus amount results in a larger amount of the shift (error) along the direction of the Gr line L1 between the A-series image sequence and the B-series image sequence.

Figure 13:
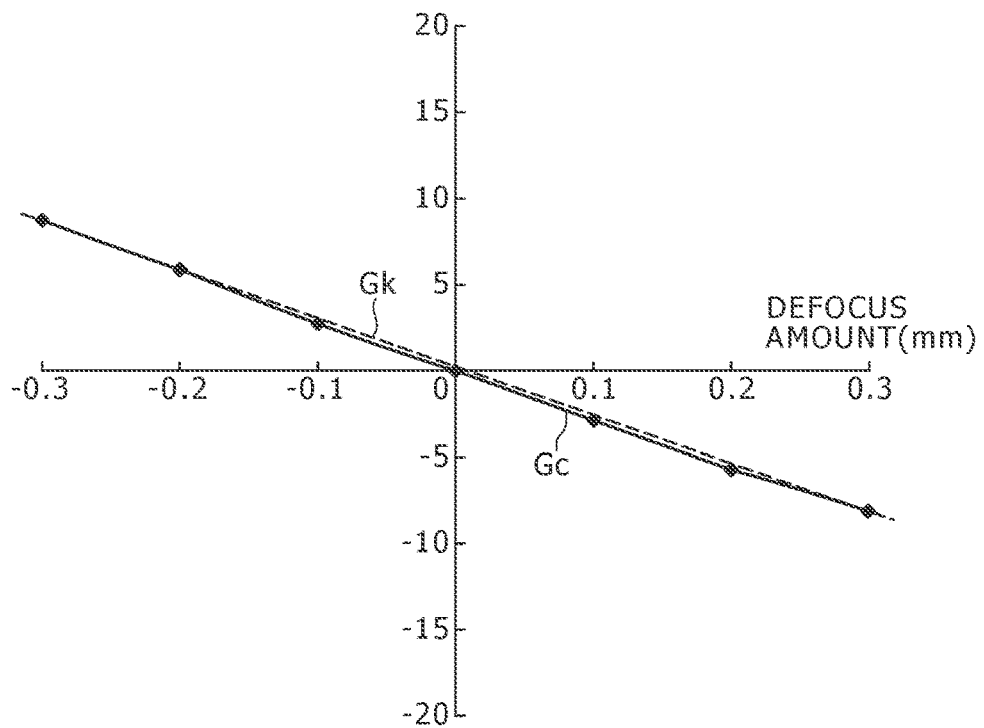
FIG. 13 is a diagram for explaining a graph Gc that indicates the relationship between the defocus amount and the centroid position difference between a pair of image sequences.

When the relationship between the defocus amount and the amount of the shift between a pair of image sequences (A-series and B-series image sequences) is translated into a graph, the graph Gc shown in FIG. 13 is obtained. In FIG. 13, the abscissa indicates the defocus amount (mm), while the ordinate indicates the difference in the centroid position (expressed by the number of pixels) between the A-series image sequence and the B-series image sequence. The centroid position $X_g$ of an image sequence can be obtained in accordance with e.g. Equation (1).

$$X_g = \frac{X_1 Y_1 + X_2 Y_2 + \ldots + X_n Y_n}{Y_1 + Y_2 + \ldots + Y_n} \quad \text{Equation (1)}$$

In Equation (1), $X_1$ to $X_n$ denote the pixel positions on the Gr line L1 from the left end for example, and $Y_1$ to $Y_n$ denote the output values of the pixels at the positions $X_1$ to $X_n$, respectively.

As shown by the graph Gc in FIG. 13, the relationship between the defocus amount and the difference in the centroid position between a pair of image sequences is a proportional relationship. When this relationship is expressed as an equation in which the defocus amount is DF (μm) and the centroid position difference is C (μm), Equation (2) is obtained.

$$DF = k \times C \quad \text{Equation (2)}$$

The coefficient k in Equation (2) denotes the slope Gk (represented by the dashed line) of the graph Gc in FIG. 13, and can be acquired in advance through a factory test or the like.

As described above, the difference in the centroid position (phase difference) regarding the A-series data and B-series data obtained from the divided G pixels 11gr is obtained in the phase difference AF arithmetic circuit 76. Subsequently, the defocus amount is calculated by using Equation (2), and the drive amount equivalent to the calculated defocus amount is given to the focus lens 211. This allows auto focus (AF) control in which the focus lens 211 is rapidly moved to the detected focal position. The relationship between the defocus amount and the drive amount of the focus lens 211 is uniquely determined depending on the design values of the imaging lens 2 mounted on the camera body 10.

That is, in the imaging device 1, a pair of image sequences are created based on the respective charge signals from the photoelectric converters 113 and 116 of the divided pixels 11gr, which receive the subject light beams Ta and Tb that have passed through a pair of partial areas of the exit pupil Ep shown in FIG. 7. Furthermore, the amount of the error (shift) along the direction of the Gr line L1 regarding this pair of image sequences is detected to thereby carry out the phase difference AF.

In view of the depth of field of a typical digital camera, it is preferable to carry out final focusing through focal detection by a contrast detection system (contrast AF), of which focusing accuracy is higher than that of the phase difference AF. Therefore, the imaging device 1 of the present embodiment also employs the contrast AF for highly accurate focusing. The principle of this contrast AF will be described below.

In the contrast AF in the imaging device 1, a pixel group of the non-divided G pixels 11gb is read out in the AF area defined in a part (e.g., the center part) of the imaging range, and an AF evaluation value is calculated. This AF evaluation value is calculated as e.g. the total sum of the absolute values of the differences between adjacent non-divided G pixels 11gb in the AF area.

Figure 14:
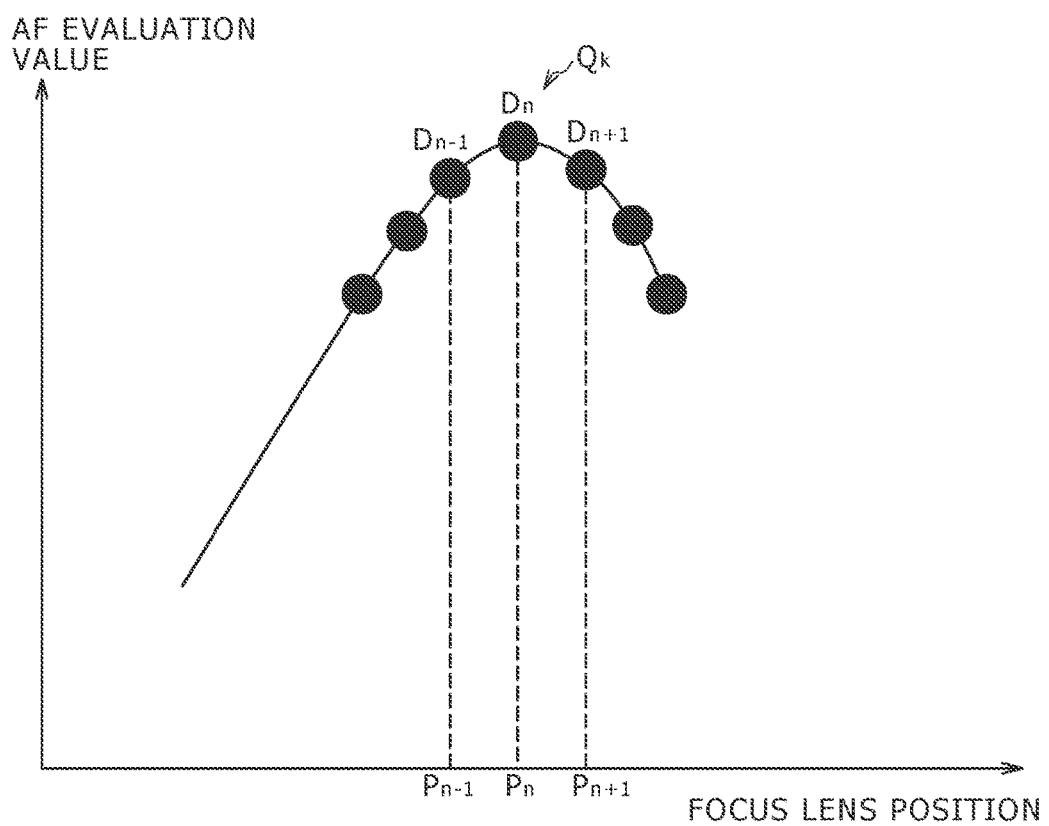
FIG. 14 is a diagram for explaining the principle of contrast AF.

If the AF evaluation values are sequentially calculated in linkage with the movement of the focus lens 211 in a constant direction, the relationship like that shown in FIG. 14 is obtained between the respective positions of the focus lens 211 and the AF evaluation values. Specifically, in this relationship, in linkage with the focus lens position change, the AF evaluation value monotonically increases and then monotonically decreases after reaching a peak Qk. The movement of the focus lens 211 is continued until the focal zone is found, i.e., the AF evaluation value passes through the peak Qk.

If AF evaluation values $D_{n-1}$, $D_n$, and $D_{n+1}$ near the peak Qk and the corresponding points $P_{n-1}$, $P_n$, and $P_{n+1}$ of the focus lens 211 are acquired as shown in FIG. 14, the focus position $P_f$ of the focus lens 211 can be calculated by using quadratic interpolation approximation expressed by Equation (3).

$$Pf = \frac{D_{n-1}(P_{n+1}^2 - P_n^2) + D_n(P_{n-1}^2 - P_{n+1}^2) + D_{n+1}(P_n^2 - P_{n-1}^2)}{2\{D_{n-1}(P_{n+1} - P_n) + D_n(P_{n-1} - P_{n+1}) + D_{n+1}(P_n - P_{n-1})\}} \quad \text{Equation (3)}$$

In the contrast AF, AF evaluation values are obtained in the contrast AF arithmetic circuit 77, and the focus lens 211 is moved by the focus drive controller 71A to the focus position obtained in accordance with Equation (3). This allows auto focus control with high focusing accuracy.

The imaging device 1 of the present embodiment performs hybrid AF as the combination of the above-described phase difference AF employing the divided G pixels 11gr and the contrast AF employing the non-divided G pixels 11gb. The specific operation of the imaging device 1 regarding this hybrid AF will be described below.

The above description has dealt with mountain-climbing AF based on a general contrast system. However, the present embodiment allows movement to the focus position through the hybrid AF to be described below even when the AF evaluation value does not pass through the peak Qk.

<Operation of Imaging Device 1>

Figure 15:
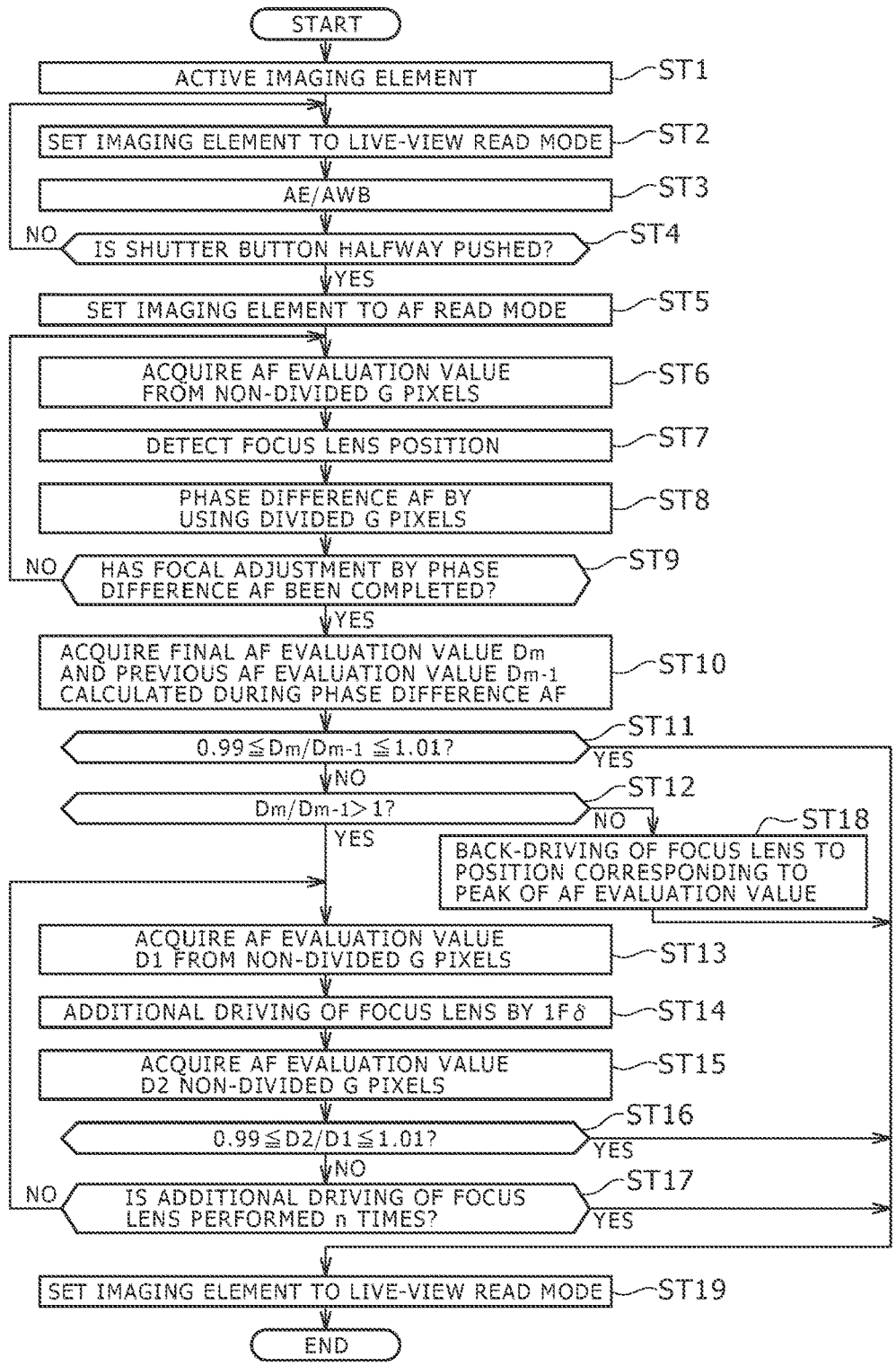
FIG. 15 is a flowchart showing the basic operation of the imaging device 1.

FIG. 15 is a flowchart showing the basic operation of the imaging device 1. This operation is executed by the main controller 62.

Initially, the power supply to the imaging device 1 is turned on through the main switch 317, so that the imaging element 101 is activated (step ST1).

In a step ST2, the imaging element 101 is set to the live-view read mode. Specifically, as described above, the frame rate is set to 60 fps. Furthermore, an image relating to live-view displaying is created based on outputs from the non-divided pixels (the non-divided G pixels 11gb, the R pixels 11r, and the B pixels 11b) of the imaging element 101, and the created image is displayed on the EVF 316. In the creation of the image, decimation on a horizontal line basis is carried out in such a way that the data of G pixels on the Gr lines L1 (divided G pixels 11gr), which are absent because being not employed for the image, are interpolated by the data of the non-divided G pixels 11gb on the Gb lines L2, adjacent to the divided G pixels 11gr in the oblique direction.

The reason for the creation of a live-view image by use of the non-divided pixels (the non-divided G pixels 11gb, the R pixels 11r, and the B pixels 11b) is as follows. Specifically, when an image is created by using the divided G pixels 11gr, it is difficult to stably create proper images, because the gains of outputs from the photoelectric converters 113 and 116 (see FIG. 7) of the divided G pixels 11gr are adjusted to proper levels by the AGC circuit in the signal processor 52, and hence there is a possibility that simple addition of these adjusted outputs leads to overflow. Although images with proper levels can be created through averaging of outputs from the photoelectric converters 113 and 116 of the divided G pixels 11gr, circuits and so on are required for the averaging, which causes complication of the device configuration.

Therefore, in the imaging device 1 of the present embodiment, a live-view image is created in such a way that output signals from the divided pixels are excluded and only output signals from the non-divided pixels are used, in order to stably create proper images without complication of the device configuration.

In a step ST3, auto exposure control (AE) and auto white balance control (AWB) are implemented. Also in this step, similarly to the above-described processing of creating a live-view image, the AE processing and the AWB processing are executed in such a way that output signals from the divided G pixels 11gr are not employed but only output signals from the non-divided pixels (the non-divided G pixels 11gb, the R pixels 11r, and the B pixels 11b), of which inside is not divided, are used.

In a step ST4, it is determined whether or not the shutter button 307 is halfway pushed (S1) by a user. If the shutter button 307 is halfway pushed, the operation sequence proceeds to a step ST5. If it is not halfway pushed, the operation sequence returns to the step ST2.

In the step ST5, the imaging element 101 is set to the AF read mode. Specifically, control of the hybrid AF is started with the frame rate set to 240 fps as described above. Also in the AF read mode, live-view displaying is performed based on output signals from the non-divided pixels (the non-divided G pixels 11gb, the R pixels 11r, and the B pixels 11b), which are read out at 60 fps.

In a step ST6, based on outputs from the non-divided G pixels 11gb in the AF area in the imaging element 101, an AF evaluation value is calculated and acquired by the contrast AF arithmetic circuit 77. That is, based on an image signal produced in the imaging element 101, an AF evaluation value (focal detection information) to be used for focal detection by a contrast detection system is acquired.

In a step ST7, the position of the focus lens 211 is detected based on the number of pulses output from the lens position detector 25 in the imaging lens 2. It is preferable to detect the position of the focus lens 211 at the intermediate time of the period of exposure of the non-divided pixels used for the calculation of the above-described AF evaluation value.

In a step ST8, phase difference AF is carried out by using output signals from the divided G pixels 11gr in the imaging element 101. Specifically, the centroid position difference regarding A-series data and B-series data obtained from the photoelectric converters 113 and 116 of the divided G pixels 11gr is obtained in the phase difference AF arithmetic circuit 76, and the focus lens 211 is so driven by using Equation (2) that this centroid position difference will be eliminated. More specifically, the focus lens 211 is driven to the position detected through the phase difference AF (focal detection position).

In a step ST9, it is determined whether or not the focal adjustment through the phase difference AF has been completed. If the focal adjustment through the phase difference AF has been completed, the operation sequence proceeds to a step ST10. If it has not been completed yet, the operation sequence returns to the step ST6.

The steps ST6 to ST9 are repeated until the completion of the focal adjustment through the phase difference AF. Due to this repetition, in association with the driving of the focus lens 211 by the phase difference AF, the AF evaluation values (focal detection information) corresponding to the respective positions of the focus lens 211 are acquired as history information of the focal detection. This history information of the AF evaluation value is stored in e.g. a memory in the main controller 62.

In the step ST10, of the history information of the AF evaluation values calculated during the phase difference AF, the final AF evaluation value $D_m$ calculated last and the AF evaluation value $D_{m-1}$ that is previous to the final AF evaluation value $D_m$ (previous-to-final AF evaluation value $D_{m-1}$) are acquired.

In a step ST11, it is determined whether or not the ratio of the final AF evaluation value $D_m$ to the previous-to-final AF evaluation value $D_{m-1}$ is in the range of 0.99 to 1.01 inclusive. The purpose of this determination is to regard the position of the focus lens 211 as the focus position to thereby specify the focus position when the ratio of the final AF evaluation value $D_m$ to the previous-to-final AF evaluation value $D_{m-1}$ is in the range of 100%±1%, because when the ratio is in this range, the focus lens 211 has been driven to a position corresponding to an AF evaluation value in a range near the peak Qk (FIG. 14), where the slope of the AF evaluation value curve is gentle.

If it is determined in this step ST11 that the relationship $0.99 \leq D_m/D_{m-1} \leq 1.01$ is satisfied, i.e., if the focus position of the focus lens 211 is specified based on the above-described history information of the AF evaluation values (the previous-to-final AF evaluation value $D_{m-1}$ and the final AF evaluation value $D_m$), the operation sequence proceeds to a step ST19. In contrast, if not so, the operation sequence proceeds to a step ST12.

In the step ST12, it is determined whether or not the ratio of the final AF evaluation value $D_m$ to the previous-to-final AF evaluation value $D_{m-1}$ is larger than one. If the relationship $D_m/D_{m-1}>1$ is satisfied, the operation sequence proceeds to a step ST13 based on a determination that the AF evaluation value is in a monotonic increase state. If the relationship $D_m/D_{m-1} \leq 1$ is satisfied, the operation sequence proceeds to the step ST19 based on a determination that the AF evaluation value is in a monotonic decrease state.

In the step ST13, similarly to the step ST6, an AF evaluation value D1 is acquired based on outputs from the non-divided G pixels 11gb in the AF area in the imaging element 101. At the timing immediately after the completion of the focal adjustment by the phase difference AF, the above-described final AF evaluation value $D_m$ is acquired as the AF evaluation value D1 from the history information of the AF evaluation value.

In a step ST14, additional driving of the focus lens 211 is carried out by 1Fδ equivalent to the focal depth (depth of field) in the same direction as the drive direction of the phase difference AF. Of the 1Fδ, F denotes the F number indicating the actual diaphragm regarding the imaging lens (imaging optical system) 2, and δ denotes the length twice the pixel pitch of the imaging element 101 (for example, when the pixel pitch is 6 μm, δ=12 μm).

In a step ST15, similarly to the step ST6, an AF evaluation value D2 is acquired based on outputs from the non-divided G pixels 11gb in the AF area in the imaging element 101.

Figure 16:
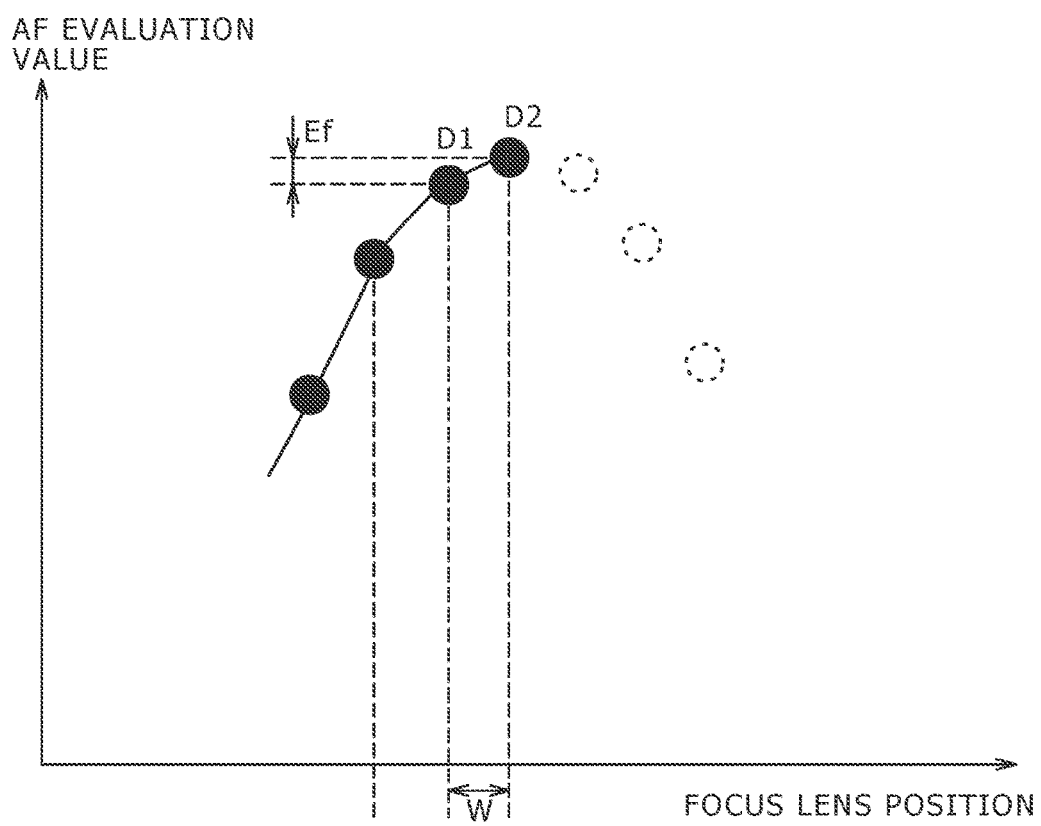
FIG. 16 is a diagram for explaining the AF operation of the imaging device 1.

In a step ST16, it is determined whether or not the ratio of the AF evaluation value D2 acquired in the step ST15 to the AF evaluation value D1 acquired in the step ST13 is in the range of 0.99 to 1.01 inclusive. The purpose of this determination is as follows. Specifically, when the AF evaluation value D2 is obtained through additional driving of the focus lens 211 by a drive amount W as shown in FIG. 16 for example in the state in which the AF evaluation value has not reached the peak Qk (FIG. 14) but is monotonically increasing, if the ratio of the AF evaluation value D1 to the AF evaluation value D2 is in the range of 100%±1%, i.e., if the difference Ef between the AF evaluation values D2 and D1 is smaller than or equal to 1% of the AF evaluation value D1, the focus lens 211 has been driven to a position corresponding to an AF evaluation value in a gentle slope area near the peak Qk (FIG. 14). Therefore, through the determination in the step ST16, the position of the additionally-driven focus lens 211 is regarded as the focus position to thereby specify the focus position when the AF evaluation value ratio is in the range of 100%±1%.

If it is determined in the step ST16 that the relationship $0.99 \leq D2/D1 \leq 1.01$ is satisfied, the operation sequence proceeds to the step ST19. In contrast, if not so, the operation sequence proceeds to a step ST17 based on a determination that the focus lens 211 has not reached a position corresponding to an AF evaluation value near the peak Qk (FIG. 14).

Through the operation of the steps ST13 to ST16, the following processing is executed. Specifically, if the focus position of the focus lens 211 is not specified based on the history information of the AF evaluation values acquired so far, additional driving of the focus lens 211 by a drive amount based on the focal depth relating to the imaging lens 2 is carried out and an AF evaluation value is additionally acquired. Subsequently, the focus position of the focus lens 211 is specified based on the focal detection history information to which this additionally-acquired AF evaluation value (focal detection information) is added.

In the step ST17, it is determined whether or not the additional driving of the focus lens 211 in the step ST13 has been carried out n (e.g., n=3) times. The purpose of this determination is to stop the AF operation based on a determination that the focusing is difficult when the additional driving of the focus lens 211 is carried out several times. If the additional driving has been carried out n times, the operation sequence proceeds to the step ST19. If the number of times of additional driving is smaller than n, the operation sequence returns to the step ST13.

In the step ST18, the focus lens 211 is back-driven to the position corresponding to the peak of the AF evaluation value. Specifically, if it is determined in the step ST12 that the ratio of the final AF evaluation value $D_m$ to the previous-to-final AF evaluation value $D_{m-1}$ is lower than or equal to one, it is determined that the focus lens 211 has passed through the position corresponding to the peak of the AF evaluation value, and thus the focus position of the focus lens 211 is specified by using Equation (3). Furthermore, the focus lens 211, which has passed through the position (focus position) corresponding to the peak of the AF evaluation value through the phase difference AF, is back-driven to the specified focus position.

That is, if the focus position of the focus lens 211 is specified based on the history information of the AF evaluation values acquired during the phase difference AF and the specified focus position is different from the focal detection position detected by the phase difference AF, the focus lens 211 is driven to this focus position through the operation of the step ST18.

In the step ST19, the imaging element 101 is set from the AF read mode to the live-view read mode.

Through the above-described operation of the imaging device 1, focal detection processing by a phase difference detection system (phase difference AF) is executed based on charge signals obtained from the plural divided G pixels (second pixels) 11gr. Furthermore, contrast AF different from the phase difference AF, live-view displaying, AE, and AWB are performed based on charge signals obtained from the plural non-divided pixels (first pixels) including the non-divided G pixels 11gb, the R pixels 11r, and the B pixels 11b. Therefore, specific processing necessary for camera functions other than the phase difference AF can be executed with high accuracy.

In addition, in the imaging device 1, the divided pixels 11gr in which the plural photoelectric converters 111 to 118 are arranged have the photoelectric converters 113 and 116 that create the above-described pair of image sequences (A-series image sequence and B-series image sequence). Thus, a pair of image sequences used for the phase difference AF can be created easily.

Furthermore, in the imaging device 1, outputs from the divided pixels and the non-divided pixels are amplified by different gains in the AGC circuit of the signal processor 52. Therefore, the output level of the divided pixels as well as that of the non-divided pixels can be set to the proper level.

Moreover, in the imaging device 1, the respective non-divided pixels 11gb have a color filter of the same color (green), which allows highly-accurate and proper phase difference AF.

In addition, in the imaging device 1, the specific processing executed based on charge signal obtained from the non-divided pixels encompasses processing of contrast AF, processing relating to auto exposure control (AE), processing relating to auto white balance control (AWB), and processing of creating images relating to live-view displaying (preview displaying). Thus, the contrast AF, the AE control, and the AWB control can be carried out with high accuracy, and the live-view displaying can be performed properly.

Modification Examples

In the above-described embodiment, it is not essential to carry out phase difference AF by use of an imaging element having divided pixels (divided G pixels), of which inside is divided. The phase difference AF may be carried out by using any of imaging elements 101A and 101B shown in FIGS. 17 and 18.

FIG. 17 is a diagram for explaining the configuration of the imaging element 101A according to a modification example of the present invention.

On Gr lines (see the Gr lines L1 in FIG. 5) of the imaging element 101A, a pair of G pixels 11g (11gs, 11gt) having a green color filter 12g are arranged to sandwich an R pixel 11r having a red color filter 12r. In the G pixel 11gs, due to a slit SLa of a light-shielding plate 13a, a light beam Tb that has passed through a left-side part of an exit pupil Ep passes through the green color filter 12g and forms an image on a photoelectric converter 110. On the other hand, in the G pixel 11gt, due to a slit SLb of a light-shielding plate 13b, a light beam Ta that has passed through a right-side part of the exit pupil Ep passes through the green color filter 12g and forms an image on the photoelectric converter 110.

If the light-reception data obtained from the G pixels 11gs and 11gt with such a configuration are used as the above-described A-series data and B-series data, phase difference AF can be carried out similarly to the above-described divided G pixels 11gr.

Also in such an imaging element 101A, similarly to the imaging element 101 of the above-described embodiment, phase difference AF is carried out by using the G pixels 11 (11gs, 11gt) on the Gr lines, while contrast AF, live-view displaying, AE, and AWB are carried out by using R pixels, B pixels, and normal G pixels that are arranged on Gb lines and in which the light-shielding plates 13a and 13b are not provided. This allows execution of specific processing necessary for camera functions other than the phase difference AF with high accuracy.

FIG. 18 is a diagram for explaining the configuration of the imaging element 101B according to another modification example.

On Gr lines (see the Gr lines L1 in FIG. 5) of the imaging element 101B, a pair of G pixels 11g (11gv, 11gw) having a green color filter 12g are arranged to sandwich an R pixel 11r having a red color filter 12r. The G pixel 11gv is provided with a microlens ML of which top surface is provided with a light-shielding layer Qa obtained through black-coating with a pigment or paint for the entire surface other than a light transmissive area Pa equivalent to the slit SLa in FIG. 17. Due to this microlens ML, in the G pixel 11gv, a light beam Tb that has passed through a left-side part of an exit pupil Ep passes through the green color filter 12g and forms an image on a photoelectric converter 110. On the other hand, the G pixel 11gw is provided with the microlens ML of which top surface is provided with a light-shielding layer Qb obtained through black-coating with a pigment or paint for the entire surface other than a light transmissive area Pb equivalent to the slit SLb in FIG. 17. Due to this microlens ML, in the G pixel 11gw, a light beam Ta that has passed through a right-side part of the exit pupil Ep passes through the green color filter 12g and forms an image on the photoelectric converter 110.

If the light-reception data obtained from the G pixels 11gv and 11gw with such a configuration are used as the above-described A-series data and B-series data, phase difference AF can be carried out similarly to the above-described divided G pixels 11gr.

Also in such an imaging element 101B, similarly to the imaging element 101 of the above-described embodiment, phase difference AF is carried out by using the G pixels 11 (11gv, 11gw) on the Gr lines, while contrast AF, live-view displaying, AE, and AWB are carried out by using R pixels, B pixels, and normal G pixels that are arranged on Gb lines and in which the light-shielding layers Qa and Qb are not formed on the microlens ML. This allows execution of specific processing necessary for camera functions other than the phase difference AF with high accuracy.

In the imaging device of the above-described embodiment, it is not essential that the imaging lens 2 is freely detachable from the camera body 10. The imaging lens 2 may be fixed to the camera body 10.

In the imaging element of the above-described embodiment, the inside of the G pixel does not necessarily need to be divided into eight areas as long as the pixel inside is divided into two or more areas. Furthermore, it is not essential to divide the G pixels. R pixels or B pixels may be divided.

For the AF evaluation value of the above-described embodiment, it is not essential to calculate the total sum of the absolute values of the differences between adjacent non-divided G pixels 11gb. It is also possible to calculate the total sum of the absolute values of the squares of the differences between adjacent pixels.

In the operation of the imaging device of the above-described embodiment, it is not essential to determine in the step ST11 of FIG. 15 whether or not the ratio of the final AF evaluation value $D_m$ to the previous-to-final AF evaluation value $D_{m-1}$ is in the range of 100%±1%. For example, whether or not the ratio is in the range of 100%±3% may be determined.

In the operation of the imaging device of the above-described embodiment, it is not essential to carry out additional driving of the focus lens 211 by 1Fδ in the step ST14 of FIG. 15. Additional driving by 2Fδ may be carried out. That is, the drive amount is based on the focal depth relating to the imaging lens 2.

The divided G pixel in the above-described embodiment does not necessarily need to be divided into plural areas along the direction of the Gr lines L1 shown in FIG. 5 (horizontal direction). It may be divided into plural areas along the vertical direction. In this case, phase difference AF is carried out based on the amount of the shift in the vertical direction regarding a pair of image sequences (A-series image sequence and B-series image sequence) obtained from the divided G pixels.

It should be noted that the present invention is not limited to the aforementioned embodiments and may be modified in various ways within the spirit of the invention.

What is claimed is:
1. An imaging device, comprising:
an imager configured to:
generate an image signal of a subject; and
determine an in-focus position of a focus lens based on a contrast focus evaluation value and a phase difference focus defocus value,
wherein the contrast focus evaluation value is determined based on a contrast auto focus (AF) method from a first part of the image signal read from a normal pixel of the imager, and the phase difference focus defocus value is determined based on a phase difference AF method from a second part of the image signal read from a phase difference pixel of the imager; and at least one processor configured to drive the focus lens to the in-focus position that corresponds to a peak focus evaluation value among a plurality of focus evaluation values, wherein the focus lens is driven based on a determination that a ratio of the peak focus evaluation value to a previous focus evaluation value, prior to the peak focus evaluation value, is within a range of values.

2. The imaging device according to claim 1, wherein the peak focus evaluation value is highest among the plurality of focus evaluation values.

3. The imaging device according to claim 1, wherein
the normal pixel comprises a first color filter and the phase difference pixel comprises a second color filter, and
the first color filter and the second color filter are of same color.

4. The imaging device according to claim 1, wherein the normal pixel and the phase difference pixel are along a same direction.

5. A method, comprising:
in an imaging device:
generating, by an imager, an image signal of a subject;
determining, by the imager, an in-focus position of a focus lens based on a contrast focus evaluation value and a phase difference focus defocus value,
wherein the contrast focus evaluation value is determined based on a contrast auto focus (AF) method from a first part of the image signal read from a normal pixel of the imager, and the phase difference focus defocus value is determined based on a phase difference AF method from a second part of the image signal read from a phase difference pixel of the imager; and
driving, by at least one processor, the focus lens to the in-focus position that corresponds to a peak focus evaluation value among a plurality of focus evaluation values,
wherein the focus lens is driven based on determination that a ratio of the peak focus evaluation value to a previous focus evaluation value, prior to the peak focus evaluation value is within a range of values.

6. The method according to claim 5, wherein the peak focus evaluation value is highest among the plurality of focus evaluation values.

7. The method according to claim 5,
wherein the normal pixel comprises a first color filter and the phase difference pixel comprises a second color filter, and
the first color filter and the second color filter are of same color.

8. The method according to claim 5, wherein the normal pixel and the phase difference pixel are along a same direction.

9. A non-transitory computer-readable medium having stored thereon, computer-executable instructions, which when executed by a computer, cause the computer to execute operations, the operations comprising:
generating an image signal of a subject;
determining an in-focus position of a focus lens based on a contrast focus evaluation value and a phase difference focus defocus value,
wherein the contrast focus evaluation value is determined based on a contrast auto focus (AF) method from a first part of the image signal read from a normal pixel of an imager, and
the phase difference focus defocus value is determined based on a phase difference AF method from a second part of the image signal read from a phase difference pixel of the imager; and
driving the focus lens to the in-focus position that corresponds to a peak focus evaluation value among a plurality of focus evaluation values,
wherein the focus lens is driven based on determination that a ratio of the peak focus evaluation value to a previous focus evaluation value, prior to the peak focus evaluation value is within a range of values.

10. The non-transitory computer-readable medium according to claim 9, wherein the peak focus evaluation value is highest among the plurality of focus evaluation values.

11. The non-transitory computer-readable medium according to claim 9,
wherein the normal pixel comprises a first color filter and the phase difference pixel comprises a second color filter, and
the first color filter and the second color filter are of same color.

12. The non-transitory computer-readable medium according to claim 9, wherein the normal pixel and the phase difference pixel are along a same direction.

* * * * *